No. 648,775. Patented May 1, 1900.
M. S. NAPIER.
PISTON ROD AND PISTON CONNECTION.
(Application filed Jan. 8, 1900.)
(No Model.)
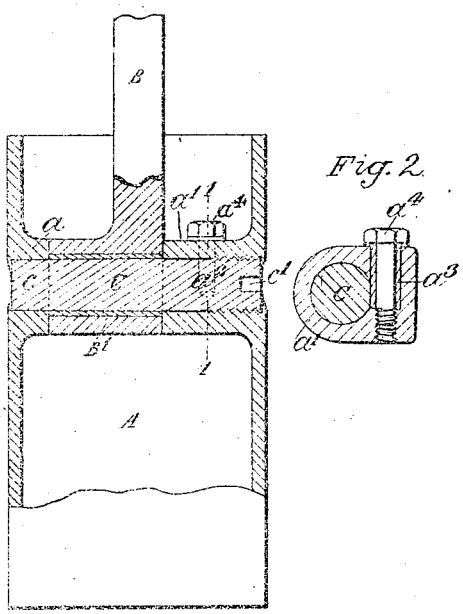
Witnesses:
Inventor
Montague S. Napier
By James L. Norris
Atty.

United States Patent Office.

MONTAGUE STANDLEY NAPIER, OF LONDON, ENGLAND, ASSIGNOR OF ONE-HALF TO SELWYN FRANCIS EDGE, OF SAME PLACE.

PISTON-ROD AND PISTON CONNECTION.

SPECIFICATION forming part of Letters Patent No. 648,775, dated May 1, 1900.

Application filed January 8, 1900. Serial No. 767. (No model.)

*To all whom it may concern:*

Be it known that I, MONTAGUE STANDLEY NAPIER, engineer, a subject of the Queen of Great Britain, residing at Vine street, York road, London, England, have invented an Improved Piston-Rod and Piston Connection, of which the following is a specification.

This invention has reference to improved means for adjusting the wrist-pin connection between a piston-rod and piston, so that the parts can be readily adjusted in order to compensate for the wear that takes place at the bearing. For this purpose I provide a tapered pin extending transversely through the piston and passing through a correspondingly-tapered eye on the end of the piston-rod. The said pin is so constructed that it can be longitudinally adjusted to take up the wear and be firmly locked in such adjusted position.

I will describe the invention more fully with reference to the accompanying drawings, in which—

Figure 1 is a longitudinal section, and Fig. 2 a transverse section on the line 1 1 of Fig. 1, showing my invention applied to the piston and piston-rod of a gas-engine.

A is the piston, and B is the piston-rod. The said piston is provided with internal lateral bosses $a$ $a'$, through which the pin C is adapted to be passed from the exterior of the piston. These bosses $a$ and $a'$ are made with cylindrical holes for the pin C to enter. The eye B' of the piston-rod B is made tapering in accordance with the taper of the pin C. The larger end C' of the said pin is screw-threaded, as also is the interior of the boss $a'$, for the screw-threads on the pin to engage with. The larger end of the said pin is also provided with a recess $c'$ or is otherwise formed to receive a suitable tool for turning the pin to adjust it. The boss $a'$ is formed with a transverse hole or cavity for the reception of a movable sleeve $a^3$, which by means of a set-screw $a^4$ can be caused to firmly press against the said pin to tightly grip it and retain it in its adjusted position.

When it is desired to take up any wear occurring between the pin C and the eye B' of the piston-rod, the set-screw $a^4$ is unscrewed, thereby releasing the pressure which the sleeve $a^3$ exerts on said pin. The said pin can then be turned in order to cause it to advance in its bosses the requisite distance to take up the amount of slack existing between it and the aforesaid eye B'. The said set-screw $a^4$ is then tightened up again, so as to cause the sleeve $a^3$ to firmly press against the said pin and maintain it in its newly-adjusted position.

What I claim is—

1. The combination, with a piston and piston-rod, of a tapered pin adapted to be passed transversely through the piston and through a tapered eye on the piston-rod, there being means for enabling the said pin to be longitudinally adjusted and means for firmly locking the said pin after its adjustment, substantially as and for the purpose specified.

2. The combination with a piston and piston-rod, of a tapered pin adapted to be passed transversely through the piston and through a tapered eye on the piston-rod, said pin having screw-threads adapted to engage with corresponding screw-threads on a boss formed on the interior of the piston, said pin having means for enabling the said pin to be turned in order to adjust it longitudinally and means for locking it in its adjusted position substantially as and for the purpose specified.

3. The combination with the piston and piston-rod, of a tapered pin adapted to be passed transversely through the piston and through a tapered eye on the piston-rod, the pin being provided with cylindrical ends and the piston with internal bosses to receive said cylindrical ends, said pin also provided with screw-threads at its larger end which engage with screw-threads formed in the corresponding boss, said pin provided also with means for enabling it to be longitudinally adjusted, and a movable sleeve and a set-screw for holding or liberating said pin, substantially as specified.

In testimony whereof I have hereunto set my hand, in presence of two subscribing witnesses, this 22d day of December, 1899.

MONTAGUE STANDLEY NAPIER.

Witnesses:
A. E. WHITE,
WALTER E. ROCHE.